UNITED STATES PATENT OFFICE.

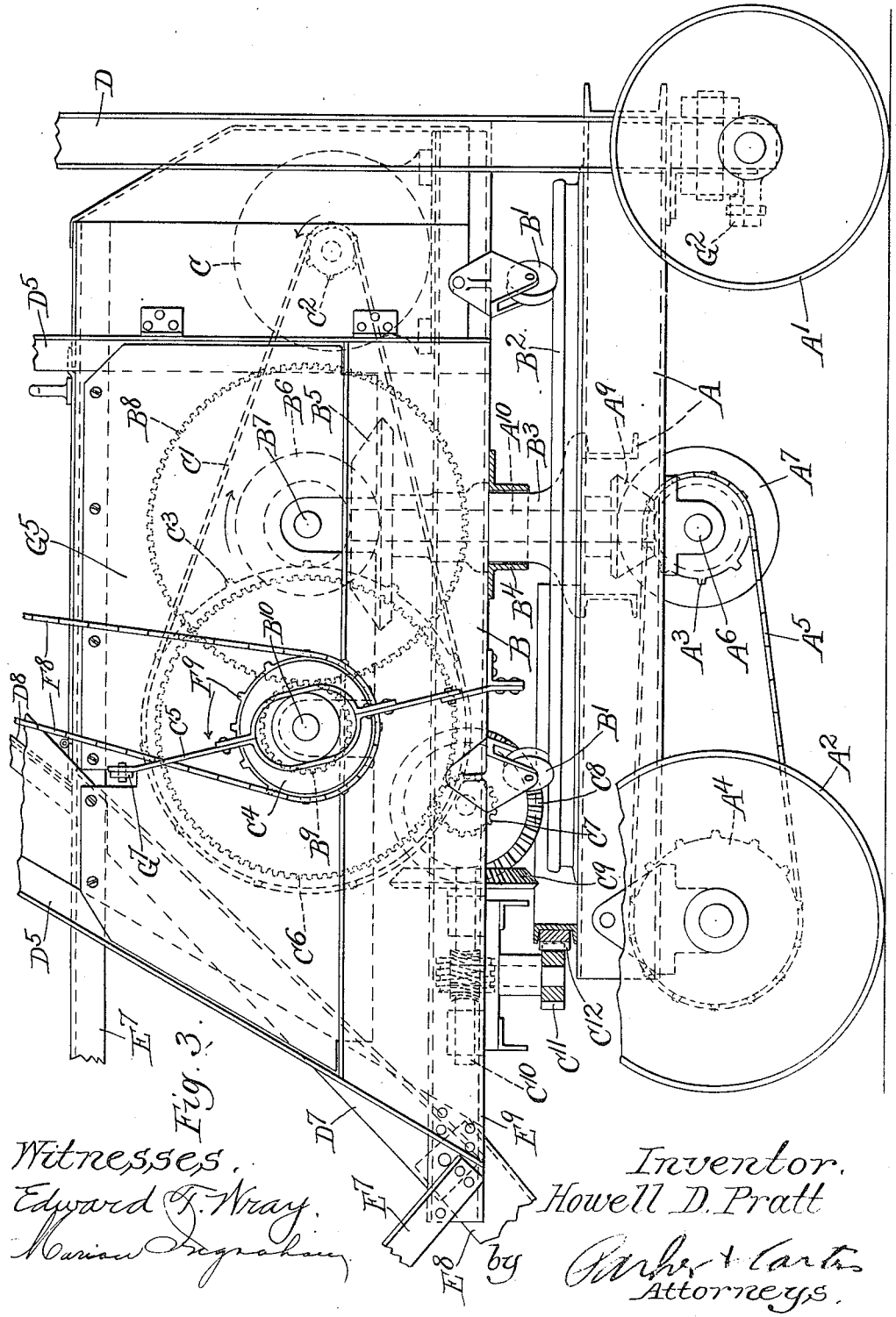

HOWELL D. PRATT, OF PHILADELPHIA, PENNSYLVANIA, ASSIGNOR TO LINK-BELT COMPANY, OF CHICAGO, ILLINOIS, A CORPORATION OF ILLINOIS.

LOADER.

1,287,094.      Specification of Letters Patent.     Patented Dec. 10, 1918.

Application filed May 2, 1917. Serial No. 165,807.

*To all whom it may concern:*

Be it known that I, HOWELL D. PRATT, a citizen of the United States, residing at Philadelphia, in the county of Philadelphia and State of Pennsylvania have invented a certain new and useful Improvement in Loaders, of which the following is a specification.

My invention relates to improvements in excavators or wagon loaders. One object of my invention is to provide a new and improved form of self-contained, self-propelled excavating or loading machine which will pick up the spoil or materials from the floor and subsequently discharge it into a hopper by which it may be carried around and stored until the wagon approaches for filling. Obviously, of course, the material may be discharged right through the hopper and drop into the wagon or it may be discharged into the hopper and be held for a while, or it may be discharged into the hopper and the machine itself may go to where the wagon is and there unload. One object of my invention is to provide an arrangement wherein the excavating boom may be adjustable. Another object is to provide a machine which will be easily and conveniently manipulated and controlled. Other objects will appear from time to time in the specification.

My invention is illustrated more or less diagrammatically in the accompanying drawings, wherein—

Fig. 3 is a side elevation of the truck and the machinery housing on an enlarged scale with parts in section.

Like parts are indicated by like letters in all the drawings.

Figure 1:
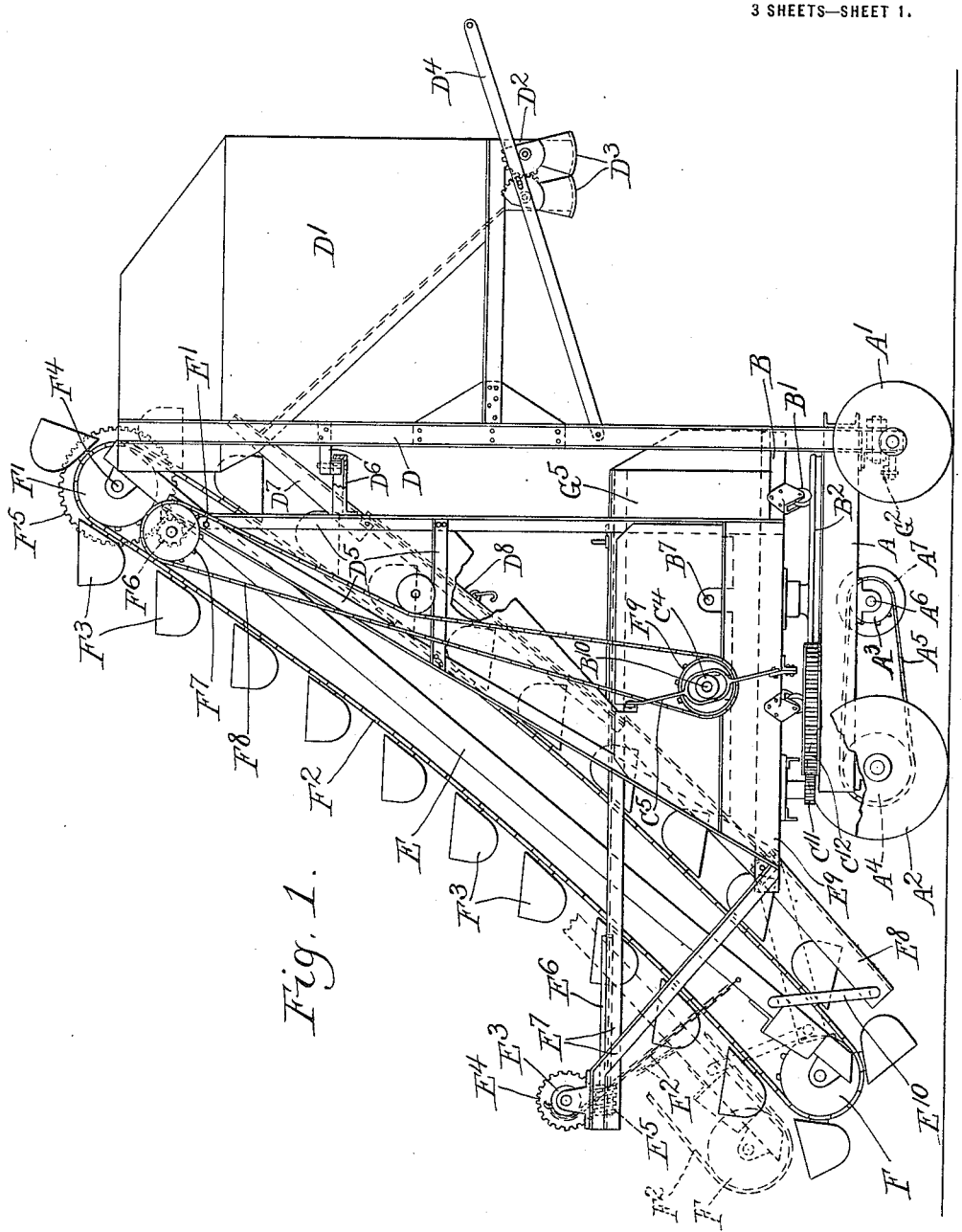
Figure 1 is a side elevation.
Figure 2:
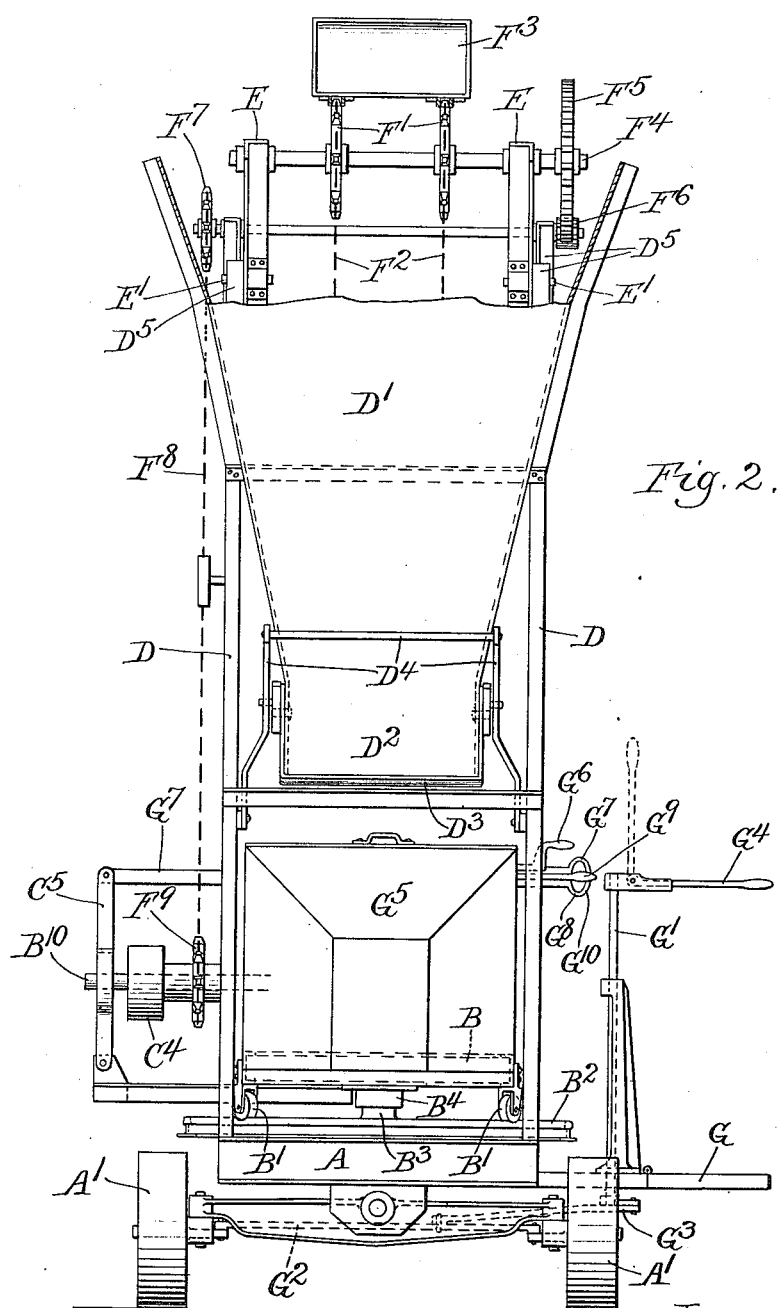
Fig. 2 is an end elevation.

A is a wagon or tractor frame. It is mounted on steering wheels $A^1$ and driving wheels $A^2$. These driving wheels are driven by means of a sprocket $A^4$, chains $A^5$, driven from a sprocket wheel $A^3$ on a jack shaft $A^6$. This jack shaft is driven by a mitered gear $A^7$ in mesh with a miter pinion $A^9$, which in turn is mounted on and rotates with a vertical shaft $A^{10}$ extending upwardly from the frame.

B is a rotating platform. It is provided with rollers $B^1$ which travel along the circular track $B^2$ on the frame A. $B^3$ is a lug projecting upwardly from the frame A engaged by sleeve $B^4$ projecting downwardly from the frame B so as to hold parts in central position, the shaft $A^{10}$ extending upwardly through the center of the lug and sleeve. $B^5$ is a miter gear mounted on the upper end of the shaft $A^{10}$. It is in mesh with a miter gear $B^6$ on a drive shaft $B^7$. This drive shaft $B^7$ is driven by a gear $B^8$ integral therewith in mesh with a pinion $B^9$, which pinion is rotatably mounted on the shaft $B^{10}$.

C is a driving motor. $C^1$ a sprocket chain traveling over a sprocket $C^2$ on the motor shaft, and a large sprocket $C^3$. The sprocket $C^3$ is mounted on the shaft $B^{10}$. A clutch $C^4$ controlled by a clutch lever $C^5$ is interposed between the sprocket and the shaft so that the shaft may be rotated by the sprocket at the will of the operator to propel the vehicle. $C^6$ is a gear parallel with the sprocket $C^3$. In mesh with it is a pinion $C^7$. This pinion drives a mitered gear $C^8$ in mesh with a mitered gear $C^9$ on a shaft $C^{10}$. This shaft, by means of a chain of gearing not specifically indicated, drives a gear $C^{11}$ in mesh with gear teeth $C^{12}$ on the frame A, so that as this gear is rotated, the platform is caused to rotate about its central point. This furnishes the power turn. I have not illustrated the clutch whereby this power is controlled as it forms no part of my invention. It is of course contained within the housing inclosing the machinery parts and interposed between the gear $C^6$ and the shaft. It is hidden by the other parts.

D is a tower extending upwardly from the frame A, with a storage hopper $D^1$. This hopper is open at the top and is provided with a discharge mouth $D^2$, extending out in front of the machine. This mouth is closed by gates $D^3$ controlled by a gate lever $D^4$ pivoted on the tower. It will be noted that the hopper is open at the top and adapted to receive material from the conveyer subsequently to be described. $D^5$ is an A frame projecting upwardly from the turn table B. $D^6$ is a link connecting the A frame and the tower D so that the tower is stiffened and supported by the A frame, although the A frame is free to rotate with respect to the tower as the turn table is rotated. $D^7$ is a drip chute supported in an inclined framework $D^8$ extending downwardly from the upper edge of the hopper and overlying the machinery so as to protect it from dripping from the moist or sometimes partially liquid material carried by the conveyer.

E is the excavating or conveying boom. It is pivoted as $E^1$ on the upper end of the A-frame $D^5$ and supported at its lower end by the chain $E^2$ wound about the drum $E^3$. This drum $E^3$ carries a worm wheel $E^4$ in mesh with a worm $E^5$ on the worm shaft $E^6$ which is driven from the motor, the connections not being shown. $E^7$ is a frame extending across the platform B and having members on either side of the boom so as to position the boom, prevent it swinging sidewise, and carry and support the drum by which the lower end of the boom is raised and lowered.

$E^3$ is a frame and chute pivoted at its upper end on the frame $E^9$ extending outwardly from the platform B and suspended at its lower end by a link $E^{10}$, which is pivoted on the frame and the boom, so that as the boom is rotated, this frame and chute will always be in operative position with respect to the boom.

F, $F^1$ are sprocket wheels on the opposed ends of the boom. $F^2$ is an endless sprocket chain wound about the wheels and carrying excavating buckets $F^3$. These excavating buckets normally travel when they are operated in a clockwise direction, and thus the upper side of the chain will be tight and will need no special support. The lower side of the chain, however, will be loose or slack, and so the buckets can travel along the frame $D^8$ which, for a part of its length, carries the drip chute. When they get off this frame they travel along the frame or chute $E^8$ and come down and do their digging as indicated. The drive is taken from the upper end of the sprocket, the sprocket shaft $F^4$ having a driving gear $F^5$ mounted thereon. This gear is in mesh with a driving pinion $F^6$ which in turn is driven by a driving sprocket $F^7$ upon which the driving chain $F^8$ is wound. This chain goes back to a sprocket $F^9$ on the shaft $B^{10}$ so that it may be driven from the motor to drive the buckets in the usual way.

G is the working or controlling platform. It is located adjacent the foot of the tower at the front end of the apparatus, and is mounted on the frame A. Projecting upwardly in front of the operator is a steering shaft $G^1$ connected to the steering wheels in the usual manner by the link $G^2$ and lever $G^3$. This steering shaft has a folding handle $G^4$ which will fold up when the steering wheels are not being manipulated out of the way, and which drops down so that the operator can control it when he wishes to guide the machine. $G^5$ is a housing inclosing all the operating and working mechanism, engine, etc. Projecting outwardly from this housing are a series of levers, $G^6$ controlling the direction of movement of the machine when it is being propelled, $G^7$ to control the elevating mechanism for swinging the boom up or down, $G^8$ for controlling the swivel clutch to swing the platform from side to side, $G^9$ a change speed lever for changing the speeds of the machinery, and $G^{10}$ a lever for starting and stopping the hoisting mechanism.

It will be evident that while I have shown in my drawings an operative device, still many changes might be made in size, shape and arrangement of parts, without departing materially from the spirit of my invention, and I wish, therefore, that my drawings be regarded as in a sense diagrammatic.

The use and operation of my invention are as follows:—

The operator who is to use my device first takes his place upon the running platform, unfolds the steering lever, starts the motor, and throws in the driving clutch. He then propels the vehicle either forward or back as the case may be until he reaches the place where he wishes to pick up the fertilizer or the material. He then manipulates the boom swinging lever to drop the free end of the boom down to the proper position. He then swings the platform from one side to the other until he reaches the point where he wishes to excavate, and then starts the excavating or lifting or elevating chain. He then feeds the machine into the pile. As soon as the buckets commence to bite on the pile of material they will pick it up and carry it over and dump it into the hopper. This hopper will soon be filled, and it can then be discharged into a wagon or other receptacle which may be driven under the discharge mouth, or if there is a continuous chain of cars or wagons the hopper will never have time to fill, but it will catch the material which is being lifted up as the wagons are changed and thus save the necessity of starting and stopping the machine, the hopper being of sufficiently large capacity to care for the interval between the loading of separate wagons.

If for some reason no wagons are available and it is desired to convey this material away, the operator will operate it until the hopper is filled. He will then stop the hoisting mechanism and manipulate his vehicle by its own power and drive it to the proper place where it will be dumped.

It will be seen that the operator has all the levers for controlling, steering, driving, operating and otherwise manipulating all the parts of the apparatus right at his finger ends. He can stand at his platform and do all the work which has to be done even including the loading of the wagon, though the wagon lever extends out far enough so that the wagon man can control that if need be.

The chute extending downwardly from the turn table frame and discharging immediately below the center of the lower boom sprocket, obviously prevents spilling of the material, and makes it unnecessary to go over the ground again. That is to say, any material which is going to drop off the buckets will drop off them before they get up to the end of their excursion. This material will be caught in the drip chute fixed on the frame beneath the boom, will be discharged down into it into the adjustable chute, and by the adjustable chute will be discharged back into the excavating zone, so that all material lost by the buckets will be picked up by them again.

I claim:

1. A loader comprising a supporting truck, a hopper overhanging one end thereof, a boom pivoted above and adjacent the inner side of the hopper and overhanging the opposed end of the truck, a frame member extending outwardly above and beyond the overhanging end of the boom, adjustable means interposed between such member and the boom for rotating it about its pivot point, a traveling conveyer mounted upon the boom and adapted to travel therealong to excavate material at the lower end of the boom and to discharge it into the hopper at the upper end thereof, a frame located beneath the boom adapted to guide and carry the return portion of the excavator and a chute carried by said frame adapted to discharge downwardly toward the end of the boom to protect the supporting truck from dripping and deposition from the conveyer, and an adjustable discharge chute and apron carried by the boom suspended below it and pivoted at one end immediately below the fixed discharge apron adapted to discharge into the working excavating zone at the lower end of the boom.

2. A loader comprising a portable supporting truck, a mast extending upwardly at one side thereof, a turn-table mounted on the truck adjacent the mast, a framework projecting upwardly from the turn-table adjacent the mast, a rolling connection between the upper end of the frame and the mast, a hopper carried by the mast projecting outwardly away from the turn-table, an excavating boom pivoted at its upper end on the framework at a point adjacent the mast extending downwardly across the turn-table to project outwardly beyond the opposed side of the truck.

3. A loader comprising a portable supporting truck, a mast extending upwardly at one side thereof, a turn-table mounted on the truck adjacent the mast, a framework projecting upwardly from the turn-table adjacent the mast, a rolling connection between the upper end of the frame and the mast, a hopper carried by the mast projecting outwardly away from the turn-table, an excavating boom pivoted at its upper end on the framework at a point adjacent the mast extending downwardly across the turn-table to project outwardly beyond the opposed side of the truck, a horizontal framework mounted on the turn-table extending outwardly from the boom supporting framework and projecting beyond the truck, a boom supporting means interposed between the lower end of the boom and the outer end of such horizontal framework.

In testimony whereof, I affix my signature in the presence of two witnesses this 27th day of April, 1917.

HOWELL D. PRATT.

Witnesses:
 ED. F. MULLIN,
 HAROLD A. WILDRICK.